US009026853B2

(12) United States Patent
Zemer et al.

(10) Patent No.: US 9,026,853 B2
(45) Date of Patent: May 5, 2015

(54) ENHANCING TEST SCRIPTS

(75) Inventors: Meidan Zemer, Hod-Hasharon (IL);
Salman Yaniv Sayers, Petach-Tikva (IL); Gil Perel, Herzeliya (IL); Yair Horovitz, Mazkeret Batya (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 316 days.

(21) Appl. No.: 13/563,635

(22) Filed: Jul. 31, 2012

(65) Prior Publication Data

US 2014/0040667 A1 Feb. 6, 2014

(51) Int. Cl.
*G06F 11/00* (2006.01)
*G06F 11/36* (2006.01)

(52) U.S. Cl.
CPC .................................. *G06F 11/3684* (2013.01)

(58) Field of Classification Search
USPC ................................................. 714/28, 32–38
See application file for complete search history.

(56) References Cited

U.S. PATENT DOCUMENTS

| | | | | |
|---|---|---|---|---|
| 5,754,760 | A * | 5/1998 | Warfield | 714/38.1 |
| 6,549,944 | B1 | 4/2003 | Weinberg et al. | |
| 6,792,393 | B1 * | 9/2004 | Farel et al. | 702/186 |
| 6,957,420 | B2 * | 10/2005 | Hand et al. | 717/125 |
| 7,039,899 | B1 * | 5/2006 | Quiroga | 717/115 |
| 7,185,235 | B2 * | 2/2007 | Radestock | 714/47.1 |
| 7,272,753 | B2 * | 9/2007 | Kaplan et al. | 714/38.1 |
| 7,389,216 | B2 * | 6/2008 | Parent et al. | 703/21 |
| 7,587,637 | B2 * | 9/2009 | Garakani | 714/37 |
| 7,752,607 | B2 * | 7/2010 | Larab et al. | 717/135 |
| 7,757,175 | B2 | 7/2010 | Miller | |
| 8,522,083 | B1 * | 8/2013 | Cohen et al. | 714/38.1 |
| 8,522,214 | B2 * | 8/2013 | Roth | 717/126 |
| 8,533,531 | B2 * | 9/2013 | El Mahdy et al. | 714/28 |
| 8,762,113 | B2 * | 6/2014 | Santhosh et al. | 703/2 |
| 8,914,679 | B2 * | 12/2014 | Apostoloiu et al. | 714/38.1 |
| 2003/0074606 | A1 | 4/2003 | Boker | |
| 2006/0129892 | A1 * | 6/2006 | Diaconu et al. | 714/38 |
| 2006/0285665 | A1 * | 12/2006 | Wasserblat et al. | 379/114.14 |
| 2008/0244322 | A1 * | 10/2008 | Kelso | 714/38 |
| 2008/0244523 | A1 * | 10/2008 | Kelso | 717/124 |
| 2008/0244524 | A1 * | 10/2008 | Kelso | 717/124 |
| 2009/0254329 | A1 * | 10/2009 | Thakkar | 703/13 |
| 2010/0153087 | A1 * | 6/2010 | Kirtkow et al. | 703/21 |
| 2010/0153780 | A1 * | 6/2010 | Kirtkow et al. | 714/37 |
| 2011/0145795 | A1 | 6/2011 | Khanapurkar et al. | |
| 2011/0271284 | A1 * | 11/2011 | Simonian | 718/102 |
| 2011/0314341 | A1 * | 12/2011 | Varadharajan | 714/38.1 |
| 2013/0132774 | A1 * | 5/2013 | Somendra | 714/32 |
| 2013/0282354 | A1 * | 10/2013 | Sayers et al. | 703/21 |
| 2014/0033179 | A1 * | 1/2014 | Gustus et al. | 717/127 |

OTHER PUBLICATIONS

The Complete Testing Solution for E-business 2002.*

(Continued)

*Primary Examiner* — Amine Riad
(74) *Attorney, Agent, or Firm* — Hewlett-Packard Patent Department (57) ABSTRACT

Example embodiments disclosed herein relate to enhancing test scripts with dynamic data. The disclosed embodiments include receiving production data that reflects real user interaction with an application process. Test scripts are generated based on the production data, where the test scripts simulate behavior relating to execution of the application process. The embodiments also include automatically enhancing the test scripts with dynamic data that includes at least one of correlation data and asynchronous data.

20 Claims, 4 Drawing Sheets

(56) References Cited

OTHER PUBLICATIONS

M. Tomlinson, "How To: Correlate Dynamic Data in a Load Test Transaction", retrieved Apr. 30, 2012, htttps://perftesting.codeplex.com/wikipage?title=How%20To%3A%20Correlate%20 Correlate% 20Dynamic% 20Data%20in%20a%20Load%20Test% 20Transaction.

* cited by examiner

ENHANCING TEST SCRIPTS

BACKGROUND

Users access application processes located on server computers using client computers. Such application processes include web applications. A user's experience depends on the performance of the application when deployed and accessed by the user. Thus, performance testing of the application is important to determine how an application may function when deployed and to make necessary corrections to defects. Test scripts are used to implement testing of applications.

DETAILED DESCRIPTION

Introduction

Various embodiments described below were developed to generate enhanced test scripts for application testing. The enhanced test scripts may be used to perform load testing, functional testing, or application programming interface (API) testing. The disclosed embodiments provide enhanced or augmented test scripts that accurately represent real user activity or interaction with an application.

There are numerous challenges to building test scripts for performance testing of applications. One of such challenges is building test scripts that accurately reflect real user activity. Typically, information available for building test scripts include a list of hits and corresponding frequency that represent flows a user goes through when interacting with the application. However, this information is not sufficient to create a realistic test script. User activity in an application comprises multiple paths taken through the application and recreating the different paths in a manner that enables effective testing may be complex. To illustrate the complexity and challenges involved, consider an example application such as an online store web application. The online store may include a login page, an item search page, a view item details page, a checkout page, an add item page, a log-off page, and many more pages. Users may traverse these pages in completely different manners and the manner in which pages are viewed or traversed may constitute completely different business processes. For example, a customer user may login, search for an item, view item details, proceed to checkout, and then log off. Alternately, or in addition, some other customer users may complete a similar purchasing flow without logging off and others may complete the purchase without viewing item details. Further, an administrator user may occur in parallel, where the administrator user may login, add a new item, and then perform a search to verify that the new item shows up. Thus, this example online store application may include a diverse range of users and flows. Moreover, other application may include even more complex number of users and flows.

Basic test scripts may include a series of uniform resource locator (URL) requests that comprise these flows. However, these URL sequences do not provide a working script as they lack script enhancements such as correlations and asynchronous data. Accordingly, the disclosed embodiments describe automatically generating enhanced test script that include correlation data and asynchronous data for accurately testing applications, where real user activity/interaction with the application is accounted for. In addition, the enhanced test scripts are further augmented with advanced pattern matching algorithms to identify parameterization rules, pre-defined correlation rules, pre-defined asynchronous rules, and replacement and adaptation rules for adapting the enhanced test scripts to that of the testing environment. The automated enhanced test scripts, when compared to basic test scripts, provide robust testing of applications.

An example implementation includes receiving production data reflecting real user interaction with an application process and generating test scripts based on the production data, where the generated test scripts simulate behavior relating to execution of the application process. The implementation also includes automatically enhancing the generated test scripts with dynamic data including at least one of correlation data and asynchronous data. The correlation data identifies communication between at least one client computer and a server computer and the asynchronous data includes asynchronous data of a plurality of execution instances of the application process.

The following description is broken into sections. The first, labeled "Environment," describes an example of a network environment in which various embodiments may be implemented. The second section, labeled "Components," describes examples of physical and logical components for implementing various embodiments. The third section, labeled "Operation," describes steps taken to implement various embodiments.

Figure 1:
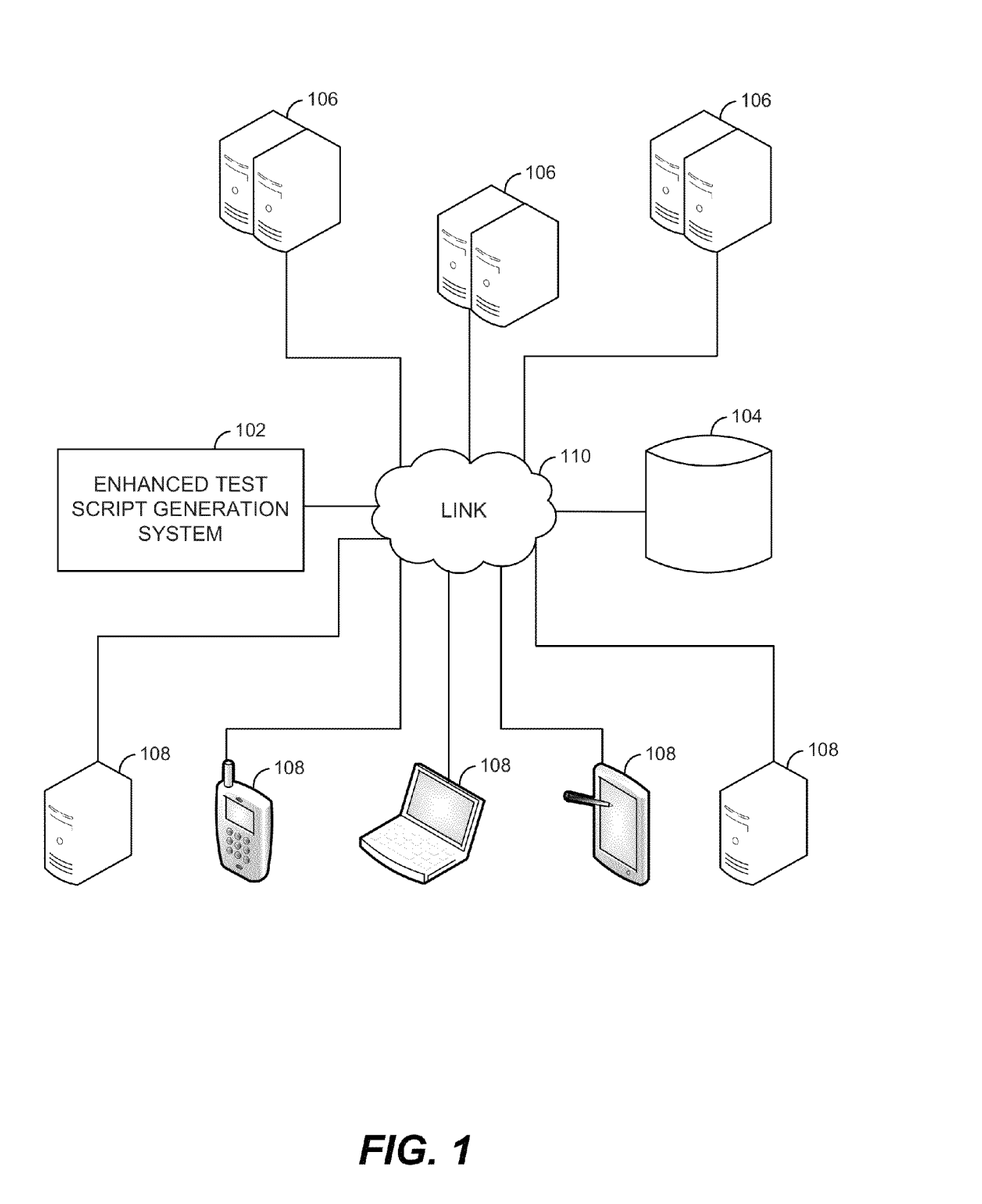
FIG. 1 depicts an environment in which various embodiments may be implemented.
Figure 2:
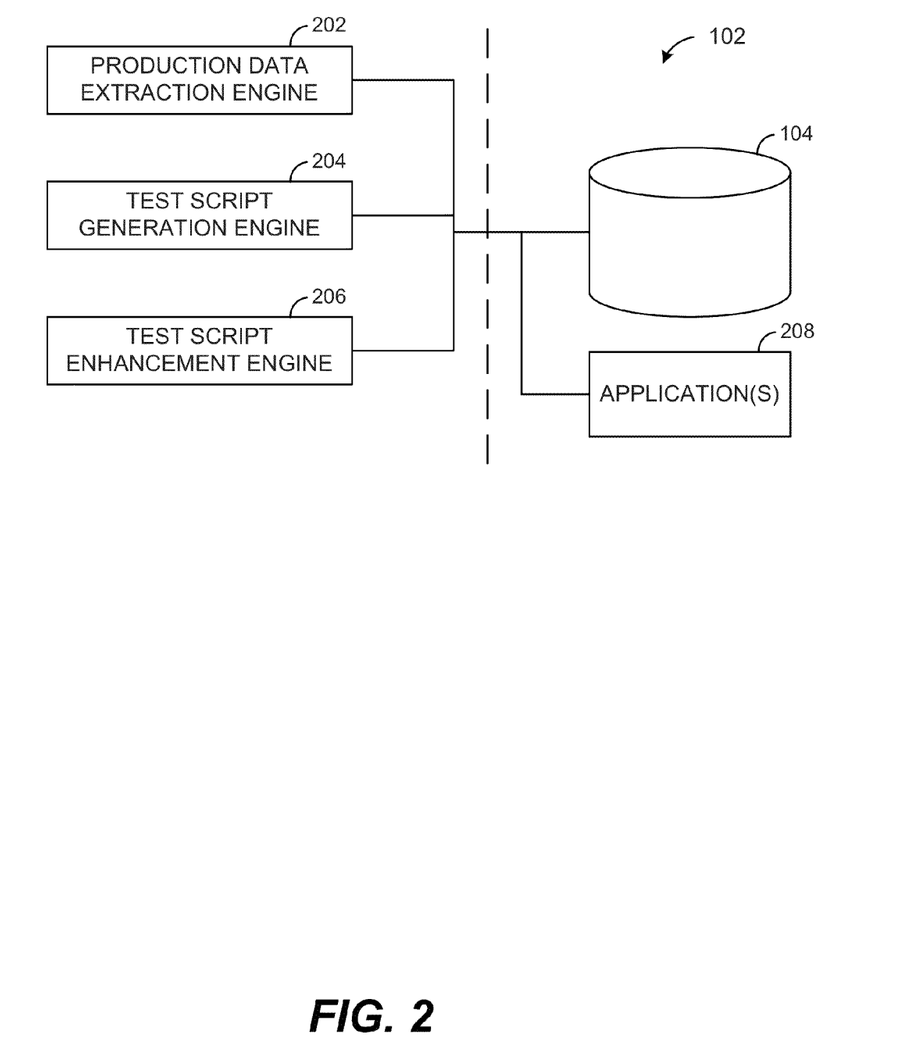
FIG. 2 depicts an enhanced test script generation system according to an example.
Figure 3:
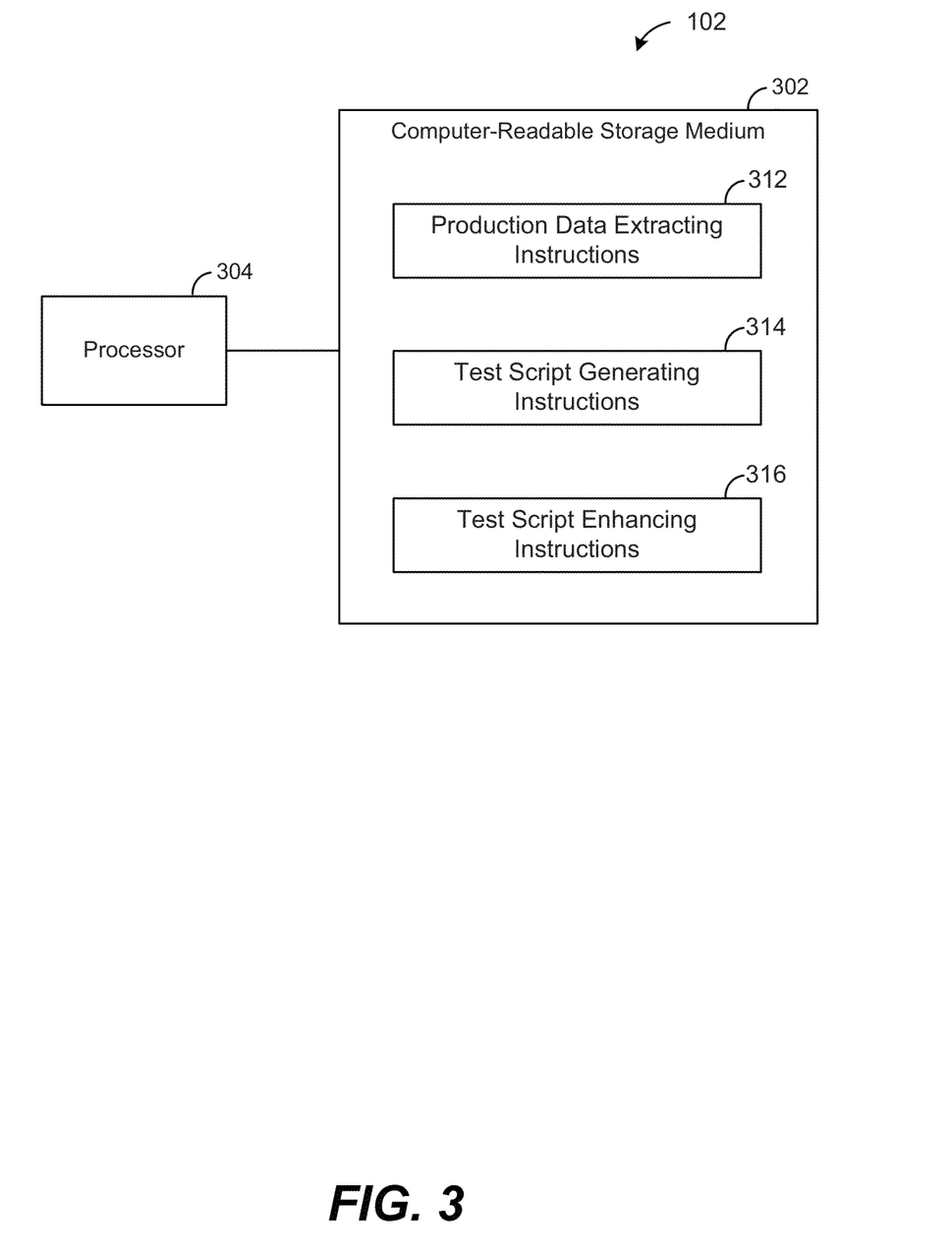
FIG. 3 depicts an example implementation of a processor and a computer-readable storage medium encoded with instructions for implementing an enhanced test script generating method.

Environment:

FIG. 1 depicts an environment 100 in which various embodiments may be implemented. Environment 100 is shown to include enhanced test script generation system 102, data store 104, server devices 106, and client devices 108. Enhanced test script generation system 102 described below with respect to FIGS. 2 and 3 represents generally any combination of hardware and programming configured to generate enhanced test scripts based on production data and dynamic data, where the dynamic data includes correlation data and asynchronous data. Data store 104 represents generally any device or combination of devices configured to store data for use by the enhanced test script generation system 102. Such data may include the correlation data, the asynchronous data, pre-defined correlation rules, pre-defined asynchronous rules, pattern matching algorithms, production data, replacement and adaptation rules, user-generated data, server-generated data, and application data. Further, the data store 104 may store the generated enhanced test scripts, for example, for reuse by the same or another application.

FIG. 1 depicts an environment 100 in which various embodiments may be implemented. Environment 100 is shown to include metadata-based test data generation system 102, data store 104, server devices 106, and client devices 108. Metadata-based test data generation system 102 described below with respect to FIGS. 2A-2B, 3A-3B, and 4-6, represents generally any combination of hardware and programming configured to generate test data based on database metadata. Data store 104 represents generally any device or combination of devices configured to store data for use by metadata-based test data generation system 102. Such data may include database metadata (e.g., column metadata), generated test data, historical test data, data constraints and rules, database relationship information, test scripts, and business rules.

In the example of FIG. 1, production data includes data generated by at least one client device and transmitted to a server device or data transformed from user input (e.g., via the at least one client computer). Production data may be communicated between one or more server devices 106 and one or more client devices 108. The application may be running on the one or more server devices 106 and provided to the one or more client devices 108. Server devices 106 represent generally any computing devices configured to respond to network requests received from client devices 108 (e.g., request for an application process). A given server device 106 may include a web server, an application server, a file server, or database server. Client devices 108 represent generally any computing device configured with browsers or other applications to communicate such requests and receive and process the corresponding responses. For example, a user may access an online store application process at the client device 108. Client devices 108 may include a notebook computer, a desktop computer, a laptop computer, a handheld computing device, a mobile phone or smartphone, a slate or tablet computing device, a portable reading device, or any other processing device. Link 110 represents generally one or more of a cable, wireless, fiber optic, or remote connections via a telecommunication link, an infrared link, a radio frequency link, or any other connectors or systems that provide electronic communication. Link 110 may include, at least in part, an intranet, Internet, or a combination of both. Link 110 may also include intermediate proxies, routers, switches, load balancers, and the like.

Components:

FIGS. 2 and 3 depict examples of physical and logical components for implementing various embodiments. FIG. 2 depicts enhanced test script generation system 102 including production data extraction engine 202, test script generation engine 204, and test script enhancement engine 206. FIG. 2 also depicts engines 202-206 coupled to data store 104 and to application process 208 (e.g., an application for which enhanced test scripts are to be generated).

Production data extraction engine 202 represents generally any combination of hardware and programming configured to extract production data. The production data reflects real user interaction with application 208. For example, production data extraction engine 202 may record real user activity with the application 208. The production data may include user input, client device 108 generated data, server device 106 generated data, or any combination thereof. To illustrate, production data extraction engine 202 may monitor interaction and traffic between the user (e.g., via client device 108) and server device 106 to extract network traffic data and network load, user click streams, user sessions and process flows (i.e., streams of pages and a user navigates when interacting with application 208), and combination of processes at different times. Thus, production data extraction engine 202 monitors interaction between the user and application 208 to learn behavior or the user and corresponding responses (and behavior) of the application. The extracted production data may be analyzed to produce network load data, performance statistics and metrics (e.g., standard deviation, maximum, minimum, etc), think time (e.g., application response times), and other user and application related performance data. The extracted production data may be stored in data store 104. In one example, production data may be retrieved or received from data store 104. In this example, production data may include previously extracted and stored production data or historical production data for application 208 or another application.

Test script generation engine 204 represents generally any combination of hardware and programming configured to generate test scripts based on the production data, where the test scripts simulate behavior relating to execution of the application process. Further, the test scripts may simulate behavior relating to execution of a plurality of execution instances of the application process. For example, the generated test scripts (e.g., a transport script) may simulate traffic behavior associated with traffic exchange between a client device 108 (or a plurality of client devices 108) and the application process 208 during execution of the application process. The generated test scripts also simulate user behavior to allow a determination of performance of the application process 208 (e.g., application process is running slowly, downtime is experienced, or some other fault or error is present).

Test script enhancement engine 206 represents generally any combination of hardware and programming configured to automatically enhance the generated test scripts with dynamic data, where the dynamic data includes at least one of correlation data and asynchronous data.

Correlation data includes data that is generated by server device 106 and communicated to client device 108 during interaction between the client device 108 and the application process 208 in the server device 106. Correlation data server-generated data) that is provided to the client device 108 may include data that is useable by the server device 106 to associate a particular communication with a given instance of the application process 208. For example, correlation data may include a session identifier for identifying a particular session between the client device 108 and the application process 208 in the server device 106. In other examples, other identifiers relating to communication flow may be used. Further, correlation data may include authentication data that is generated by server device 106 and communicated to client device 108 to allow the client device 108 to use the authentication data for subsequent communications with the application process 208. Thus, the correlation data may include response based correlation (e.g., responses from server device 106 to requests by client device 108). Moreover, static requests by client device 108 may be substituted with parameters that are calculated and generated at runtime from the response data.

Test script enhancement engine 206 may identify correlation data usable to enhance the test scripts. For example, identification of correlation data may be based on correlation rules such as a set of patterns. Thus, data matching the patterns in the set may identified as correlation data. Other examples of identifying correlation data include response-based correlation technique, where information that first arrived from the server device 106 and was later returned to the server device 106 by client device 108 is identified. Moreover, correlation data may be identified using a replay-and-scan technique, where an execution instance of an application process is recorded once, and the corresponding generated script is produced and replayed. When the replay of the script fails, the replay-and-scan technique attempts to look for correlation data by comparing the recorded data to the replayed data until a failure point is identified. It should be noted that other correlation data identification techniques may be implemented by the test script enhancement engine 206.

Asynchronous data includes asynchronous data from a plurality of execution instances of the application process 208. For example, application process 208 may asynchronously provide data that is continually changing to client device 108 (e.g., updated information such as sport scores, news, stock prices, election votes, etc.). Test script enhancement engine 206 may identify asynchronous data usable for enhancing the test script using one or more techniques. For example, a rule-based technique may be implemented to identify asynchronous data, where predefined patterns can be defined and matched to recorded data for the purpose of identifying asynchronous data. As another example, classification-based technique may be implemented, where the time and content of network traffic that was generated by the client device 108 and the server device 106 during an execution instance of the application process 208 is measured. The measured time and content may then be classified to identify asynchronous data. Further, test script enhancement engine 206 may be configured to run asynchronous pattern recognition algorithms to accurately recreate asynchronous calls. For example, recognizing poll and push patterns and replacing different separate requests with special API calls that result in the recreation of asynchronous patterns during script replay.

Test script enhancement engine 206 may also be operable to augment the enhanced test scripts with pattern matching algorithms, pre-defined correlation rules, pre-defined asynchronous rules, and testing environment replacement and adaption rules. Test script enhancement engine 206 may include other enhancement and augmenting data and make necessary adjustments to adapt the enhanced test script to the testing environment and to insert the enhanced test script to the testing environment. For example, the adaption and adjustments may be required to run the enhanced test script for a particular application, a particular server device 106, or any combination thereof. The testing environment may include functional testing, API testing, load testing, some other type of testing, or any combination thereof.

In foregoing discussion, engines 202-206 of FIG. 2 were described as combinations of hardware and programming. Such components may be implemented in a number of fashions. Looking at FIG. 3, the programming may be processor executable instructions stored on tangible, non-transitory computer-readable storage medium 302 and the hardware may include processor 304 for executing those instructions. Processor 304, for example, can include one or multiple processors. Such multiple processors may be integrated in a single device or distributed across devices. Computer-readable storage medium 302 can be said to store program instructions that when executed by processor 304 implement system 102 of FIG. 2. Computer-readable storage medium 302 may be integrated in the same device as processor 304 or it may be separate but accessible to that device and processor 304.

In one example, the program instructions can be part of an installation package that when installed can be executed by processor 304 to implement system 102. In this case, computer-readable storage medium 302 may be a portable medium such as a CD, DVD, or flash drive or a memory maintained by a server from which the installation package can be downloaded and installed. In another example, the program instructions can be part of an application or applications already installed. Here, computer-readable storage medium 302 can include integrated memory such as hard drive, solid state drive, or the like.

In FIG. 3, the executable program instructions stored on computer-readable storage medium 302 are represented as production data extracting instructions 312, test script generating instructions 314, and test script enhancing instructions 316 that when executed by processor 304 implement enhanced test script generation system 102 of FIG. 2. Production data extracting instructions 312 represent program instructions that when executed function as production data extraction engine 202. Test script generating instructions 314 represent program instructions that when executed implement test script generation engine 204. Test script enhancing instructions 316 represent program instructions that when executed implement test script enhancement engine 306.

Figure 4:
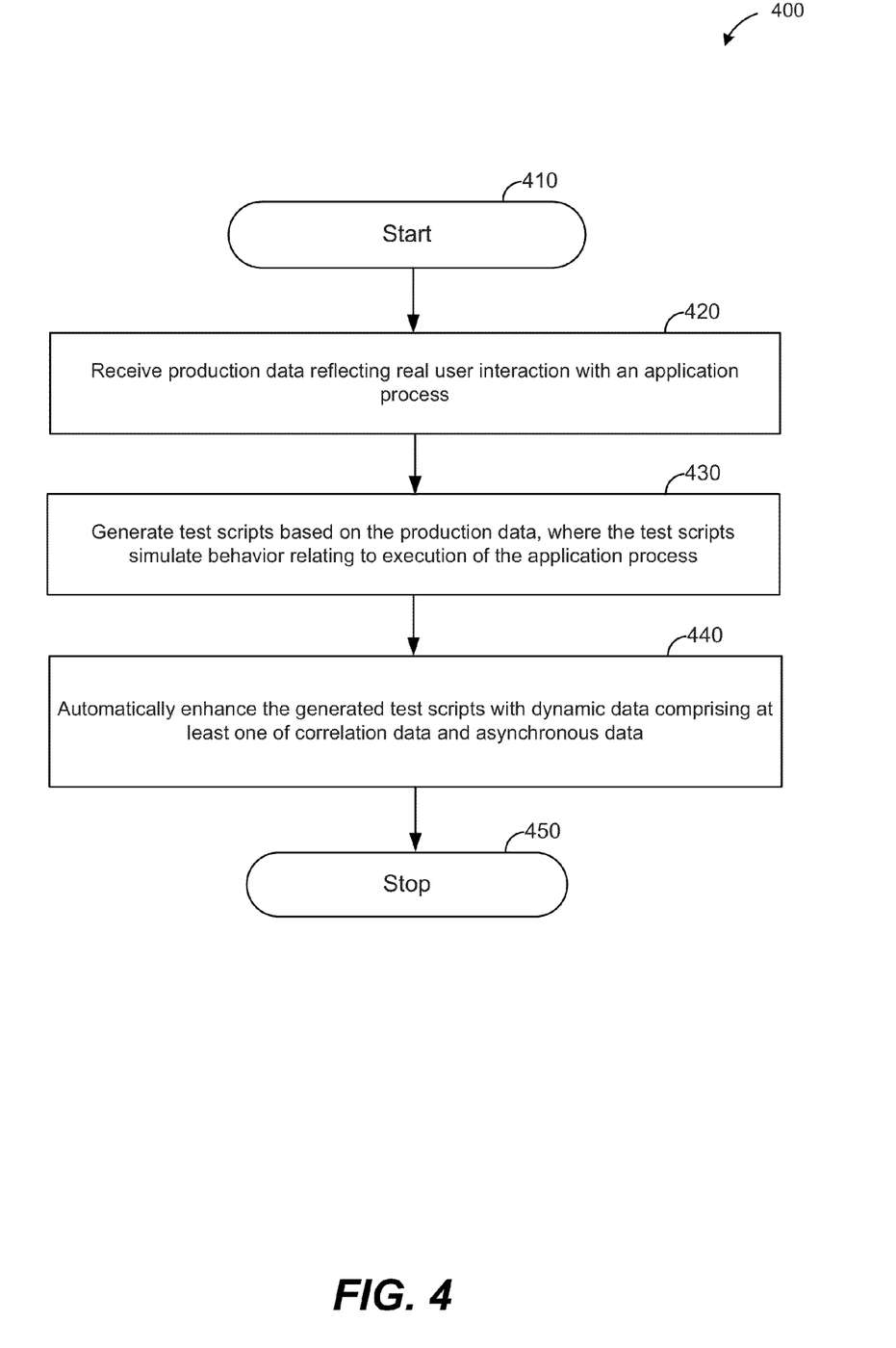
FIG. 4 is a flowchart of an example implementation of a method for generating enhanced test scripts.

Operation:

FIG. 4 is an example flow diagram of steps taken to implement embodiments of enhanced test script generation method. In discussing FIG. 4, reference is made to the diagram of FIG. 2 to provide contextual examples. Implementation, however, is not limited to those examples.

In FIG. 4, a flowchart of an embodiment of a method 400 for enhanced test script generation is described. Method 400 may start in step 410 and proceed to step 420, where production data reflecting real user interaction with an application process is received. Referring to FIG. 2, production data extraction engine 202 may monitor real user interaction and traffic between the user and application 208, and extract production data from the monitored interaction. The production data may include user input, client device 108 generated data, server device 106 generated data, or any combination thereof. The extracted production data may be stored in data store 104. Alternately, or in addition, the production data may be retrieved or received from data store 104.

Method 400 also includes step 430, where test scripts based on the production data are generated. The test scripts simulate behavior relating to execution of the application process. Referring to FIG. 2, test script generation engine 204 may be responsible for implementing step 430. For example, the generated test scripts may simulate behavior relating to execution of a plurality of execution instances of the application process. The generated test scripts may include a transport script that simulates traffic behavior associated with traffic exchange between the client device 108 and the application process 208 during execution of the application process.

Method 400 may proceed to step 440, where the generated test scripts are automatically enhanced with dynamic data that includes at least one of correlation data and asynchronous data. Referring to FIG. 2, test script enhancement engine 206 may be responsible for implementing step 440. For example, correlation data may include data that is generated by server device 106 and communicated to client device 108 during interaction between the client device 108 and the application process 208 in the server device 106. Asynchronous data may include asynchronous data from a plurality of execution instances of the application process 208. For example, application process 208 may asynchronously provide data that is continually changed to client device 108. Further, test script enhancement engine 206 may augment the generated test scripts with pattern matching algorithms, pre-defined correlation rules, pre-defined asynchronous rules, and testing environment replacement and adaptation rules. Method 400 may then proceed to step 750, where the method 400 stops.

CONCLUSION

FIGS. 1-3 depict the architecture, functionality, and operation of various embodiments. In particular, FIGS. 2 and 3 depict various physical and logical components. Various components are defined at least in part as programs or programming. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Embodiments can be realized in any computer-readable medium for use by or in connection with an instruction execution system such as a computer/processor based system or an ASIC (Application Specific Integrated Circuit) or other system that can fetch or obtain the logic from computer-readable medium and execute the instructions contained therein. "Computer-readable medium" can be any individual medium or distinct media that can contain, store, or maintain a set of instructions and data for use by or in connection with the instructions execution system. A computer-readable medium can comprise any one or more of many physical, non-transitory media such as, for example, electronic, magnetic, optical, electromagnetic, or semiconductor device. More specific examples of a computer-readable medium include, but are not limited to, a portable magnetic computer diskette such as floppy diskettes, hard drives, solid state drives, random access memory (RAM), read-only memory (ROM), erasable programmable read-only memory, flash drives, and portable compact discs.

Although the flow diagram of FIG. 4 shows specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A method comprising:
receiving production data reflecting real user interaction with an application process;
generating, using a hardware processor, test scripts based on the production data, wherein the test scripts simulate behavior relating to execution of the application process;
subsequent to generating the test scripts:
identifying asynchronous data using predefined patterns; and
automatically enhancing the test scripts with dynamic data comprising at least the asynchronous data.

2. The method of claim 1, wherein identifying asynchronous data comprises classification of a time and content of network traffic.

3. The method of claim 1, wherein the dynamic data further comprises correlation data, wherein the correlation data identifies communication between at least one client computer and a server computer, and wherein the asynchronous data includes asynchronous data of a plurality of execution instances of the application process.

4. The method of claim 1, comprising generating a plurality of execution instances of the application process based on the production data.

5. The method of claim 1, comprising automatically enhancing the test scripts using at least one of pattern matching algorithms, pre-defined correlation rules, pre-defined asynchronous rules, and replacement and adaptation rules for injecting the enhanced test scripts into a testing environment.

6. The method of claim 1, wherein behavior of the application process includes at least one of user behavior, network load, performance statistics and metrics, think time, and traffic behavior.

7. A non-transitory computer readable medium comprising instructions that, when executed by a processor, cause the processor to:
receive production data reflecting real user interaction with an application process;
generate test scripts based on the production data, wherein the test scripts simulate behavior relating to execution of the application process;
subsequent to generating the test scripts:
identify asynchronous data using predefined patterns; and
automatically enhance the test scripts with dynamic data comprising at least the asynchronous data.

8. The method of claim 1, further comprising running an asynchronous pattern matching algorithm to recreate asynchronous calls.

9. The method of claim 8, wherein running the asynchronous pattern matching algorithm comprises recognizing poll and push patterns, and replacing different separate requests with application programming interface (API) calls.

10. The non-transitory computer readable medium of claim 7, wherein the dynamic data further comprises correlation data, wherein the correlation data identifies communication between at least one client computer and a server computer, and wherein the asynchronous data includes asynchronous data generated by the server computer and provided to the at least one client computer.

11. The non-transitory computer readable medium of claim 7, wherein the real user interaction includes a plurality of combination of sequences of execution paths of the application process.

12. The method of claim 3, wherein the correlation data includes a session identifier for a particular session between the at least one client computer and the server computer.

13. The method of claim 3, wherein the correlation data includes authentication data for the at least one client computer.

14. The method of claim 3, further comprising identifying the correlation data using a response-based correlation technique.

15. The non-transitory computer readable medium of claim 7, wherein the behavior of the application process includes at least one of user behavior, network load, performance statistics and metrics, think time, and traffic behavior.

16. A system comprising:
at least one hardware processor;
a production data extraction engine to extract production data reflecting real user interaction with an application process;
a test script generation engine executable by the at least one hardware processor to generate test scripts based on the production data, wherein the test scripts simulate behavior relating to execution of the application process;
a test script enhancement engine to:
identify asynchronous data using predefined patterns; and
automatically enhance the generated test scripts with dynamic data, wherein the dynamic data includes at least the asynchronous data.

17. The system of claim 16, the test script enhancement engine to automatically:
enhance the generated test scripts with at least one of pattern matching algorithms, pre-defined correlation rules, pre-defined asynchronous rules, and testing environment replacement and adaptation rules;
insert the enhanced test scripts into a testing environment comprising at least one of functional testing environment, application programming interface (API) testing environment, and load testing environment; and adapt the enhanced test script to the testing environment.

18. The system of claim 16, wherein the real user interaction comprises multiple paths taken during execution of the application process and combinations of the multiple paths.

19. The method of claim 3, further comprising identifying the correlation data using a replay-and-scan technique.

20. The method of claim 19, wherein using the replay-and-scan technique includes comparing recorded data to replayed data until a failure point is identified.

* * * * *

UNITED STATES PATENT AND TRADEMARK OFFICE
CERTIFICATE OF CORRECTION

| | | |
|---|---|---|
| PATENT NO. | : 9,026,853 B2 | Page 1 of 1 |
| APPLICATION NO. | : 13/563635 | |
| DATED | : May 5, 2015 | |
| INVENTOR(S) | : Meidan Zemer et al. | |

It is certified that error appears in the above-identified patent and that said Letters Patent is hereby corrected as shown below:

Title page (75), Inventors, in column 1, line 3, delete "Herzeliya" and insert -- Herzliya --, therefor.

Specification

In Column 4, Line 28, delete "data server-generated" and insert -- data (i.e., server-generated --, therefor.

Signed and Sealed this
First Day of March, 2016

Michelle K. Lee
*Director of the United States Patent and Trademark Office*